US005753389A

United States Patent [19]
Gan et al.

[11] Patent Number: 5,753,389
[45] Date of Patent: May 19, 1998

[54] ORGANIC CARBONATE ADDITIVES FOR NONAQUEOUS ELECTROLYTE IN ALKALI METAL ELECTROCHEMICAL CELLS

[75] Inventors: Hong Gan; Esther S. Takeuchi, both of East Amherst, N.Y.

[73] Assignee: Wilson Greatbatch Ltd., Clarence, N.Y.

[21] Appl. No.: 638,894

[22] Filed: Apr. 25, 1996

Related U.S. Application Data

[63] Continuation-in-part of Ser. No. 405,699, Mar. 17, 1995, abandoned.

[51] Int. Cl.$^6$ .................................................... H01M 6/16
[52] U.S. Cl. ......................... 429/197; 429/194; 429/198; 429/218
[58] Field of Search .................................. 429/198, 194, 429/197, 218

[56] References Cited

U.S. PATENT DOCUMENTS

| | | |
|---|---|---|
| 4,830,939 | 5/1989 | Lee et al. . |
| 4,853,304 | 8/1989 | Ebner et al. . |
| 5,260,148 | 11/1993 | Idota . |
| 5,358,620 | 10/1994 | Golovin et al. . |

OTHER PUBLICATIONS

Impedance Spectroscopy of Nonactive Metal Electrodes at Low Potentials in Propylene Carbonate Solutions Doran Aurbac and Arie Zabon, pp. 1808–1819; J. Electrochem. Soc. vol. 141, No. 7, Jul. 1994.

J. Electroanal Chem., 339 (1992) (no month) 451–471; Elsevier Sequoia S.A. Lausanne; The behavior of lithium electrodes in propylene and ethylene carbonate: the major factors that influence Li cycling efficiency; Doron Aurbach; Yosef Gofer, Moshe Ben–Zio and Pinchas Aped.

Technical Papers; Electrochemical Science and Technology; the Correlation Between the Surface Chemistry and the Performance of Li–Carbon Intercalation Anodes for Rechargeable "Rocking Chair" Type Batteries; Doron Aurbach, yair Ein–Eli and Orit Chusid; J. Electrochme Soc. vol., 141 No. 3, Mar. 1994.

The Electrochemical Behavior of Methyl, Formate (MF) Solutions; Yair Ein Ely and Doran Aurbach; Department of Chemistry; Bar–Han University; Ramat Gan 52100, Israel; pp. 157–169 (No Date).

Influence of Electrolyte on Lithium Cycling Efficiency With Pressurized Electrode Stack: Toshior Hirai, Isamu Yoshimatsu, and Jun–ichi Yamaki, NTT Interdisciplinary Research Laboratories, J. Electrochem, Soc., vol. 141, No. 3, Mar. 1994.

*Primary Examiner*—John S. Maples
*Attorney, Agent, or Firm*—Hodgson, Russ, Andrews, Woods & Goodyear LLP

[57] ABSTRACT

An alkali metal, solid cathode, nonaqueous electrochemical cell capable of delivering high current pulses, rapidly recovering its open circuit voltage and having high current capacity, is described. The stated benefits are realized by dissolving organic additives, preferably carbonate additives in the electrolyte.

24 Claims, 9 Drawing Sheets

ORGANIC CARBONATE ADDITIVES FOR NONAQUEOUS ELECTROLYTE IN ALKALI METAL ELECTROCHEMICAL CELLS

CROSS-REFERENCE

The present application is a continuation-in-part application of application Ser. No. 08/405,699 filed Mar. 17, 1995, now abandoned.

BACKGROUND OF INVENTION

1. Field of the Invention

The present invention relates to a nonaqueous electrolyte alkali metal electrochemical cell, and in particular, a lithium cell designed for high current pulse discharge applications.

2. Description of the Prior Art

It is well known that the anode surface film, known as solid-electrolyte interphase (SEI), plays a very important role in the discharge performance of either a primary or a secondary alkali metal electrochemical cell, and in particular, a lithium cell. A good SEI benefits cell performance, including high discharge capacity, long useful life, better rechargeability for secondary cells and little or no voltage delay during high current pulse applications. Since the formation of a surface film is unavoidable for alkali metal, and in particular, lithium metal anodes, and for lithium intercalated carbon anodes, due to their low potential and high reactivity towards organic electrolytes, much effort has been focused on modification of the chemical composition and morphology of the anode surface film.

The ideal anode surface film should be electrically insulating and ionically conducting. While most alkali metal, and in particular, lithium electrochemical systems meet the first requirement, the second requirement is difficult to achieve. As a result, higher impedance builds up inside the cell due to this surface layer formation which often results in lower discharge voltage and lower cell capacity. In the case of a cell subjected to high current pulse discharge, large voltage delay and voltage drop may occur and limit the effectiveness of the cell under these conditions. The surface film also affects the efficiency and cyclability of secondary alkali metal cells.

One of the known solutions to the above problem is to saturate the electrolyte solution with carbon dioxide $CO_2$. Cycling efficiency is improved dramatically in secondary cell systems having a lithium anode and activated with $CO_2$ saturated electrolytes (V. R. Koch and S. B. Brummer, *Electrochimica Acta*, 1978, 23, 55–62; U.S. Pat. No. 4,853,304 to Ebner et al.; D. Aurbach, Y. Gofer, M. Ben-Zion and P. Aped, *J. Electroanal. Chem.* 1992, 339, 451–471). The same effect is also known for lithium intercalated carbon anode secondary batteries (D. Aurbach, Y. Ein-Eli, O. Chusid, Y. Carmeli, M. Babai and H. Yamin, *J. Electrochem. Soc.* 1994, 141, 603–611).

In spite of the success of $CO_2$, its use in electrochemical cells is limited due to the difficulty in controlling its concentration. To achieve the best results, high pressures of up to 50 psig have to be used, which further detracts from the practicality of this additive.

Instead of carbon dioxide, the present invention is directed to dissolving organic carbonate additives in the electrolyte to change the anode surface film. The carbonate additives can be either linear or cyclic carbonates, comprise covalent O—X and O—Y bonds on opposite sides of a carbonyl group and have the general structure X—O—CO—O—Y. At least one of the O—X and the O—Y bonds has a relatively low dissociation energy. When dissolved in the activating electrolyte, the carbonate additives effect the anode surface film to desirably change its ionic conductivity.

SUMMARY OF THE INVENTION

The object of the present invention is to improve the performance of a primary alkali metal electrochemical cell, and more particularly, a lithium electrochemical cell by dissolving in the nonaqueous electrolyte solution at least one of a family of carbonate additives. A further object of this invention is to provide the present electrolyte solution in operative association with an electrochemical system incorporated in a defibrillator battery to minimize or eliminate voltage delay under high current pulse discharge conditions. The concept of this invention is likewise applicable to secondary alkali metal electrochemical cells.

The aforementioned objects are achieved by the addition of at least one organic additive, preferably a carbonate additive, dissolved in the electrolyte solution of an alkali metal electrochemical cell. Unlike $CO_2$ used in the prior art cells, the present invention uses solid or liquid organic additives which provide ease in handling and in electrolyte preparation. The additives are designed to interact with the alkali metal anode, and particularly with a lithium anode to form a protective anode surface layer which improves the discharge performance of the cell and minimizes or even eliminates voltage delay under high current discharge conditions.

These and other objects of the present invention will become increasingly more apparent to those skilled in the art by reference to the following description and to the drawings.

DETAILED DESCRIPTION OF THE PREFERRED EMBODIMENTS

The electrochemical cell of the present invention includes an anode selected from Group IA of the Periodic Table of Elements, including lithium, sodium, potassium, etc., and their alloys and intermetallic compounds including, for example Li-Si, Li-B and Li-Si-B alloys and intermetallic compounds. The preferred anode comprises lithium, and the more preferred anode comprises a lithium alloy, the preferred lithium alloy being lithium-aluminum with the aluminum comprising from between about 0% to about 50% by weight of the alloy. The greater the amount of aluminum present by weight in the alloy the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode in atomic or molecular forms. The solid cathode material may comprise a metal element, a metal oxide, a mixed metal oxide, a metal sulfide or carbonaceous compounds, and combinations thereof. Suitable cathode materials include silver vanadium oxide, copper silver vanadium oxide, manganese dioxide, cobalt oxide, nickel oxide, copper vanadium oxide, titanium disulfide, copper oxide, copper sulfide, iron sulfide, iron disulfide, and fluorinated carbon. The solid cathode exhibits excellent thermal stability and is generally safer and less reactive than a non-solid cathode.

Preferably, the solid cathode material comprises a mixed metal oxide formed by the chemical addition, reaction or otherwise intimate contact or by a thermal spray coating process of various metal sulfides, metal oxides or metal oxide/elemental metal combinations. The materials thereby produced contain metals and oxides of Groups IB, IIB, IIIB, IVB, VB, VIB, VIIB and VIII of the Periodic Table of Elements, which includes the noble metals and/or their oxide compounds. By way of illustration, and in no way intended to be limiting, an exemplary cathode active material comprises silver vanadium oxide having the general formula $Ag_xV_2O_y$ in any one of its many phases, i.e. β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, and combination and mixtures of phases thereof.

The cell of the present invention includes a separator to provide physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, glass fiber materials, ceramics, polytetrafluorethylene membrane commercially available under the designations ZITEX (Chemplast Inc.), polypropylene membrane commercially available under the designation CELGARD (Celanese Plastic Company Inc.) and a membrane commercially available under the designation DEXIGLAS (C.H. Dexter, Div., Dexter Corp.).

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte operatively associated with the anode and the cathode electrodes. The electrolyte serves as a medium for migration of ions between the anode and the cathode during the electrochemical reactions of the cell and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), methyl acetate (MA), diglyme, triglyme, tetraglyme, dimethyl carbonate (DMC), 1,2-dimethoxyethane (DME), diethyl carbonate and others. High permittivity solvents include propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and others. Suitable nonaqueous solvents are substantially inert to the anode and cathode electrode materials and a preferred solvent comprises a 50/50 mixture (by volume) of propylene carbonate (PC) and dimethoxyethane (DME).

The preferred electrolyte comprises an inorganic salt having the general formula $MM'F_6$ or $MM'F_4$ wherein M is an alkali metal similar to the alkali metal comprising the anode and M' is an element selected from the group consisting of phosphorous, arsenic, antimony and boron. Examples of salts yielding $M'F_6$ are: hexafluorophosphate ($PF_6$), hexafluoroarsenate ($AsF_6$) and hexafluoroantimonate ($SbF_6$) while tetrafluoroborate ($BF_4$) is exemplary of salts yielding $M'F_4$. Thus, in the case of an anode comprising lithium, the alkali metal salt of the electrolyte of the present invention preferably comprises lithium hexafluorophosphate, lithium hexafluoroarsenate, lithium hexafluoroantimonate or lithium tetrafluoroborate dissolved in a suitable solvent mixture. Alternately, the corresponding sodium or potassium salts may be used. Other inorganic salts useful with the present invention include $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

In the present invention, the addition of certain organic carbonate additives to the electrolyte solution has beneficial effects in minimizing or eliminating voltage delay when the cell is subjected to current pulse discharge conditions. Specifically, the organic carbonate additives can be either linear or cyclic carbonates containing covalent O—X and O—Y bonds on opposite sides of a carbonyl group and have the general structure of X—O—CO—O—Y, wherein X and Y are the same or different and X is selected from $NR_1R_2$ and $CR_3R_4R_5$, Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, and at least $R_3$ is an unsaturated substituent if X is $CR_3R_4R_5$ and Y is $CR'_3R'_4R'_5$. At least one of the O—X and the O—Y bonds has a dissociation energy less than about 80 kcal/mole Examples of organic carbonate additives useful with the present invention include:

$X=Y=NR_1R_2$

Di(succinimidyl)carbonate

Di(1-benzotriazoyl)carbonate $X \neq Y$ then $X=NR_1R_2$ and $Y=CR_3R_4R_5$

N-(Benzyloxycarbonyloxy)succinimide

Succinimidyl-2,2,2-trichloroethyl carbonate 2-(4-methoxybenzyloxycarbonyloxyimino)-2-phenylacetonitrile 1,5-Bis(succinimidooxycarbonyloxy)pentane N-(9-Fluorenylmethoxycarbonyloxy)succinimide N-Benzyloxycarbonyloxy-5-norbornene-2,3-dicarboximide $X=Y=CR_3R_4R_5$ and $R_3=$unsaturated group Dibenzyl carbonate Diallyl carbonate $X \neq Y$ then $X=CR_3R_4R_5$, $R_3=$unsaturated group and $Y=CR'_3R'_4R'_5$ Allyl ethyl carbonate 4-phenyl-1,3-dioxolan-2-one It is also contemplated by the scope of the present invention that suitable organic carbonate additives can further include those where $X \neq Y$ then $X=NR_1R_2$ and $Y=NR'_1R'_2$.

The above described compounds are only intended to be exemplary of those that are useful with the present invention, and are not to be construed as limiting. Those skilled in the art will readily recognize compounds which come under the purview of the general formulas set forth above and which will be useful as carbonate additives for the electrolyte to reduce voltage delay according to the present invention.

Compounds such as those exemplified above are known to improve the high current pulse discharge performance of the alkali metal cells. The greatest effect is found when di-(N-succinimidyl) carbonate (DSC), benzyl-N-succinimidyl carbonate (BSC) and dibenzyl carbonate (DBC), and mixtures thereof are used as additives in the electrolyte.

The presence of at least one of the covalent O—X and O—Y bonds on opposite sides of the carbonyl group having a dissociation energy less than about 80 kcal/mole in the present compounds having the general formula X—O—CO—O—Y is important for improved performance of the alkali metal cells, and particularly lithium cells. Due to the respectively low O-X and O-Y bond dissociation energy, the above listed family of additives can compete effectively with electrolyte solvents or solutes to react with the lithium anode. Increased amounts of lithium carbonate are believed to be deposited on the anode surface to form an ionically conductive protective film. As a consequence, the chemical composition and perhaps the morphology of the anode surface protective layer is believed to be changed with concomitant benefits to the cell's discharge characteristics.

In the present invention, the anode is lithium metal and the cathode is preferably the transition mixed metal oxide $AgV_2O_{5.5}$ (SVO). The preferred electrolyte is 1.0M to 1.2M $LiAsF_6$ dissolved in an aprotic solvent mixture comprising at least one of the above listed low viscosity solvents and at least one of the above listed high permittivity solvents. The preferred aprotic solvent mixture comprises a 50/50, by volume, mixture of propylene carbonate and dimethoxyethane. The concentration of the above mentioned organic additives should preferably be in the range of between about 0.001M to about 0.2M. The positive effects of these additives have been achieved both at room temperature as well as at temperatures up to about 37° C.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/ terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the organic carbonate additives described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not construed as limiting.

EXAMPLE I

Lithium anode material and silver vanadium oxide cathode material were each pressed on titanium current collector screens connected to nickel leads. A prismatic cell stack assembly of a single anode and a single cathode with two layers of polypropylene separator sandwiched between the two electrodes was prepared. The thusly constructed electrode assembly was placed in a glass vessel sealed with a rubber septum and activated with a nonaqueous electrolyte. The electrochemical cell assemblies were then divided into ten cell groups.

The nonaqueous electrolyte was prepared by dissolving $LiAsF_6$ salt in each of the solvent mixtures listed in Table 1.

TABLE 1

| Electrolyte Conductivity | | | |
|---|---|---|---|
| Electrolyte | [$LiAsF_6$] (mmho/cm) | Solvent (Volume Ratio) | Conductivity |
| 1 | 1.0M | PC(50)/DME(50) | 17.30 |
| 2 | 1.2M | PC(30)/DMC(70) | 14.02 |
| 3 | 1.4M | PC(20)/MA(80) | 24.2 |
| 4 | 1.0M | GBL(40)/DME(60) | 21.3 |
| 5 | 1.3M | NMP(20)/DME(80) | 20.2 |

PC = propylene carbonate  DME = 1,2-dimethoxyethane
DMC = dimethyl carbonate  MA = methyl acetate
GBL = γ-butyrolactone  NMP = N-methyl-pyrrolidinone After the electrolyte solutions cooled to room temperature, the respective organic carbonate additives listed in table 2 were added thereto and the solutions were further diluted to the desired concentration.

TABLE 2

| Organic Carbonate Additives in Test Cells | | | |
|---|---|---|---|
| Cell Group | Additive Concentration | Additive | Electrolyte |
| 1 | 0.01M | DSC | 1 |
| 2 | 0.05M | DSC | 1 |
| 3 | 0.01M | DSC | 2 |
| 4 | 0.01M | DSC | 3 |
| 5 | 0.01M | DSC | 4 |
| 6 | 0.01M | DSC | 5 |
| 7 | 0.01M | BSC | 1 |
| 8 | 0.01M | BSC | 4 |
| 9 | 0.01M | BSC | 5 |
| 10 | 0.01M | DBC | 1 |

DSC = di-(N-succinimidyl) carbonate
BSC = benzyl-N-succinimidyl carbonate
DBC = dibenzyl carbonate To demonstrate the benefits in cell performance attributable to the organic additives of the present invention, reference test cells from each of the ten cell groups were also activated with electrolytes similar to those listed in Table 1, but without the present organic additives.

Figure 1:
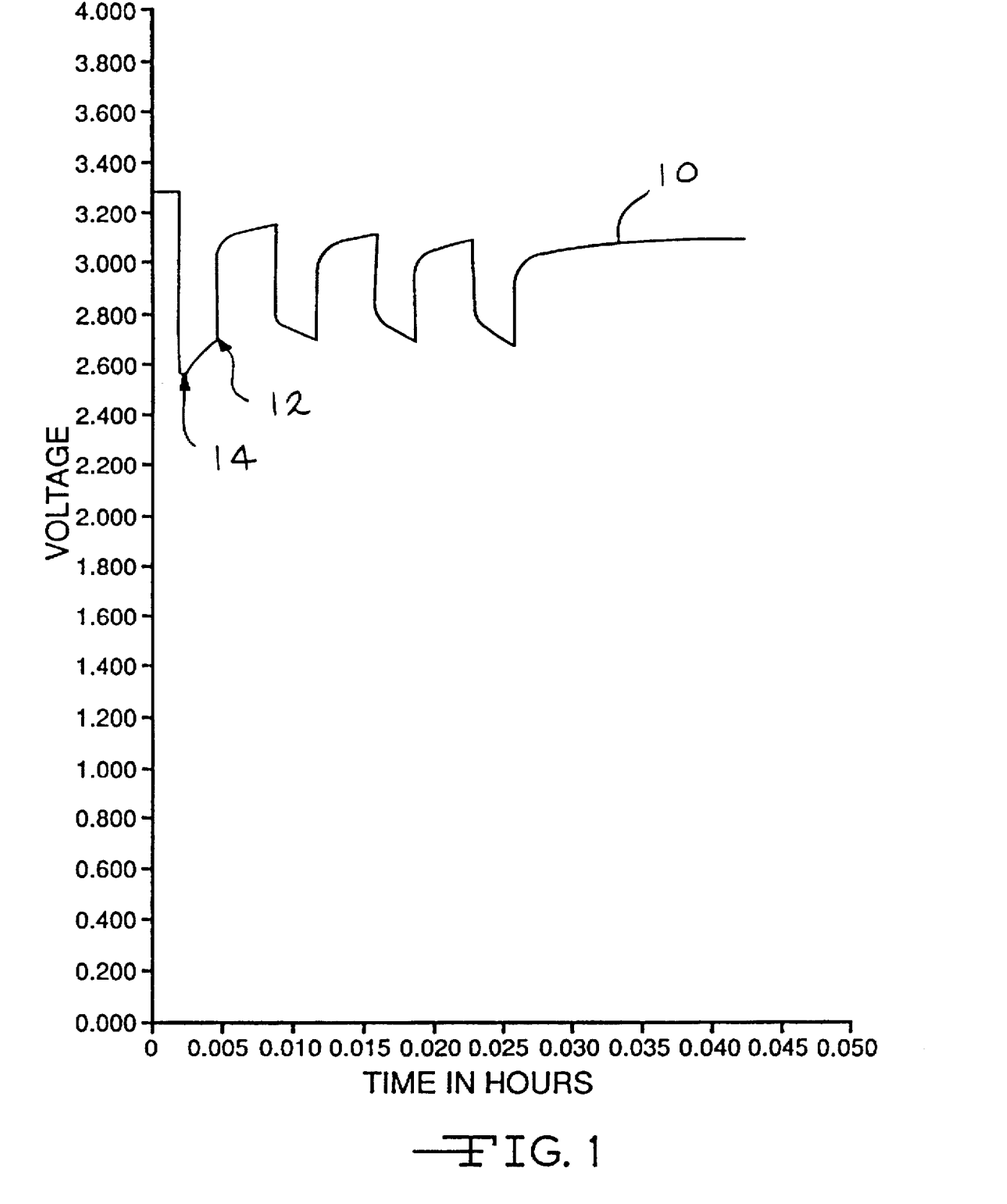
FIG. 1 is a graph showing the pulse discharge curve 10 of a control electrochemical cell activated with an electrolyte comprising an alkali metal salt dissolved in an aprotic organic solvent devoid of an organic carbonate additive according to the present invention.

All the cells, i.e., those having the organic additives of the present invention dissolved in the respective electrolytes and the reference test cells, were discharged under a 1K ohm load for 1 hour and then discharged under a 2K ohm load. These cells received once every two days an application of a pulse train consisting of four 17.7 $mA/cm^2$, 10 second pulses with 15 seconds rest between each pulse. Four pulse trains were applied to each cell. In general, voltage delay in the first pulse can be observed for all of the above reference test cells in the third and fourth pulse trains. Voltage delay is defined as pulse one end potential minus pulse one minimum potential as shown in FIG. 1 wherein the pulse discharge curve 10, pulse one end potential is indicated at 12 and pulse one minimum potential is indicated at 14. A positive value indicates the existence of voltage delay. The larger this value, the larger the voltage delay. The beneficial effects of the organic additives on the voltage delay are thus obtained by comparing the results of test cells having the organic additives of the present invention dissolved in the electrolyte solution with respect to the reference cells at pulse trains 3 and 4. The results from pulse train 4 are summarized in Table 3.

TABLE 3

Effect of Organic Additives on Test Cell Performance: Voltage Delay in Fourth Pulse Train (V)

| Cell Group | Without Additive ($P_{1end} - P_{1min}$) | With Additive ($P_{1end} - P_{1min}$) |
|---|---|---|
| 1 | 0.08 (0.08) [a] | 0.00 (0.02) [a] |
| 2 | (0.08) [b] | (0.02) [b] |
| 3 | 0.04 | 0.00 |
| 4 | 0.24 | 0.09 |
| 5 | 0.36 | 0.25 |
| 6 | (0.11) [c] | (0.06) [c] |
| 7 | 0.13 | 0.00 |
| 8 | 0.36 | 0.29 |
| 9 | (0.11) [c] | (0.05) [c] |
| 10 | 0.13 | 0.07 |

(a) Small voltage delay at 37° C.
(b) Result at 37° C. More voltage delay is observed in pulse trains 2 and 3.
(c) Pulse current density is 7.8 mA/cm$^2$.

The results form Table 3 clearly indicate the beneficial effect on cell pulse discharge performance of the organic carbonate additives of the present invention dissolved in the electrolyte solutions of the various cell groups. Voltage delay is eliminated in Cell Groups 1, 3 and 7. In all other cell groups, voltage delay is also decreased by addition of the present carbonate additives. More importantly, the improvements in minimizing voltage delay in the above example were achieved without any other detrimental effects on cell discharge performance. In addition to the noted improvements in voltage delay, it was discovered that the carbonate additives (DSC, BSC) are also useful in preventing decrease in cell potential. Alkali metal cells activated with electrolytes including these additives always have equal or higher prepulse discharge potential than the cells without them. This is especially the case when relatively more reactive solvents are used, such as GBL, NMP and MA. Higher cell capacity, thus, is expected. The data of prepulse potentials from cell groups 5, 8 and the control cell are listed in Table 4.

TABLE 4

| Cell Group | Pre-Pulse Potential (V) | | | |
|---|---|---|---|---|
| | Pulse Train 1 | Pulse Train 2 | Pulse Train 3 | Pulse Train 4 |
| Control | 3.14 | 2.68 | 2.32 | 2.04 |
| 5 | 3.13 | 2.74 | 2.42 | 2.12 |
| 8 | 3.16 | 2.77 | 2.45 | 2.14 |

EXAMPLE II

Figure 2:
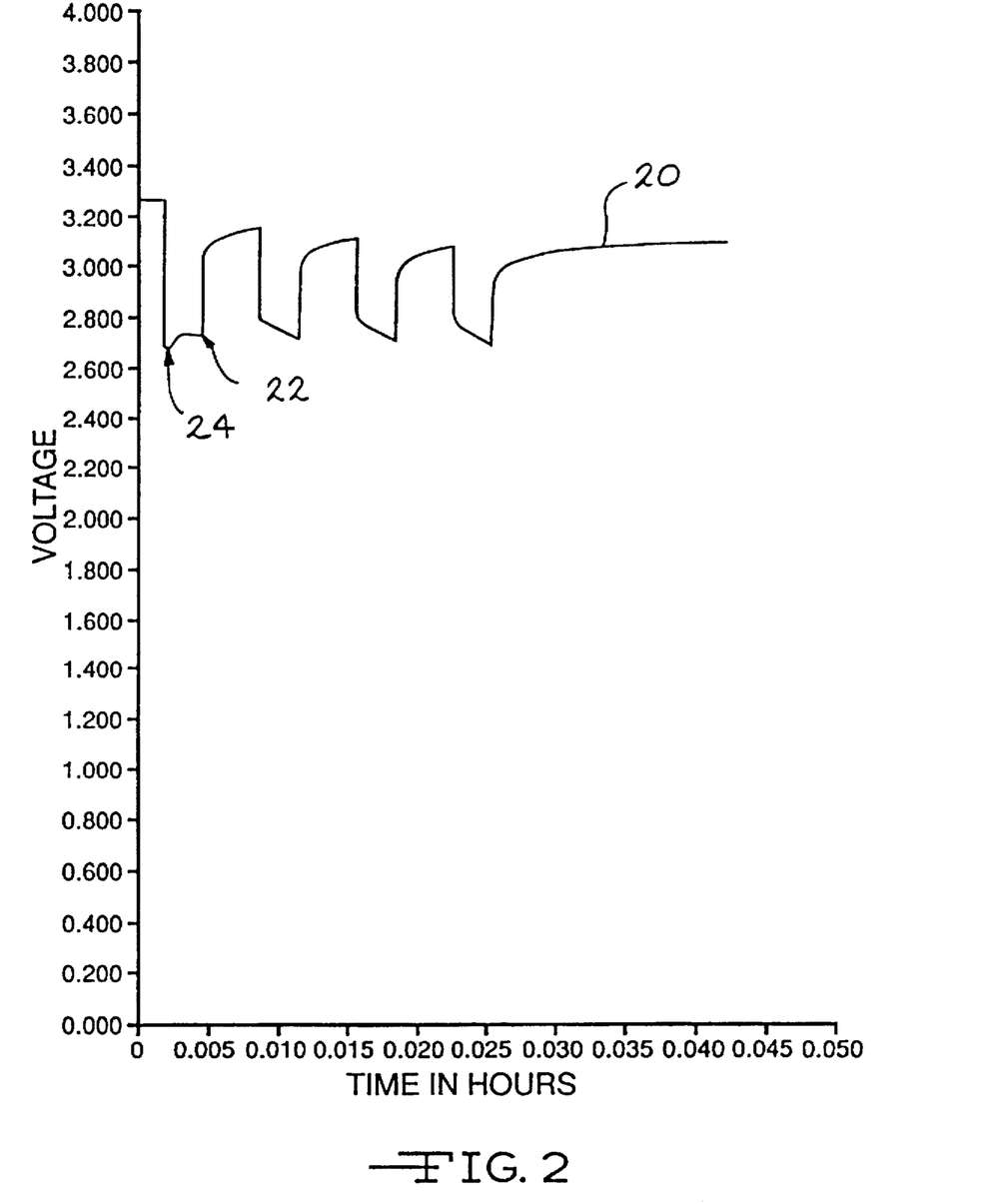
FIG. 2 is a graph showing the pulse discharge curve 20 of an electrochemical cell activated with an electrolyte comprising an alkali metal salt dissolved in an aprotic organic solvent including an organic additive according to the present invention.
Figure 3:
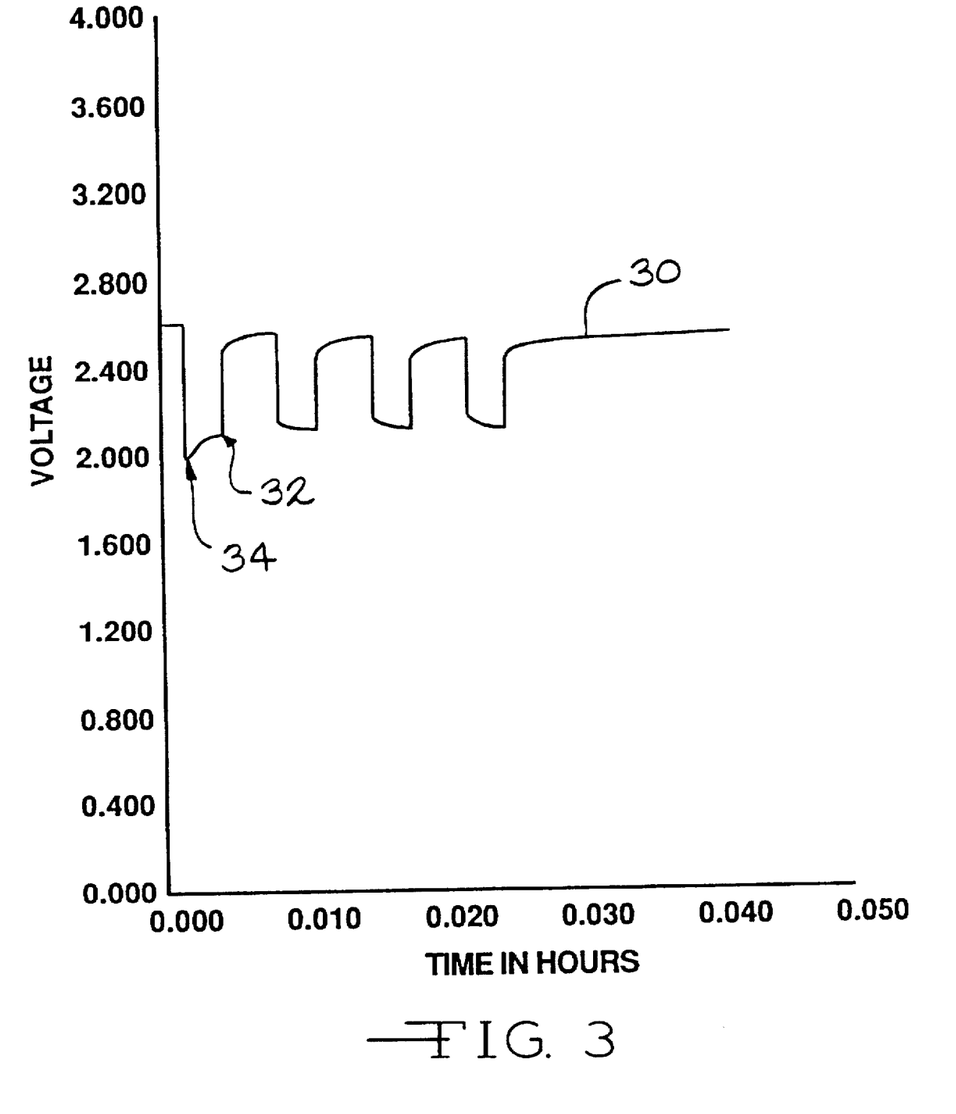
FIG. 3 is a graph showing the pulse discharge curve 30 of an electrochemical cell similar to that discharged to generate the graph shown in FIG. 2 but without the organic additive.
Figure 4:
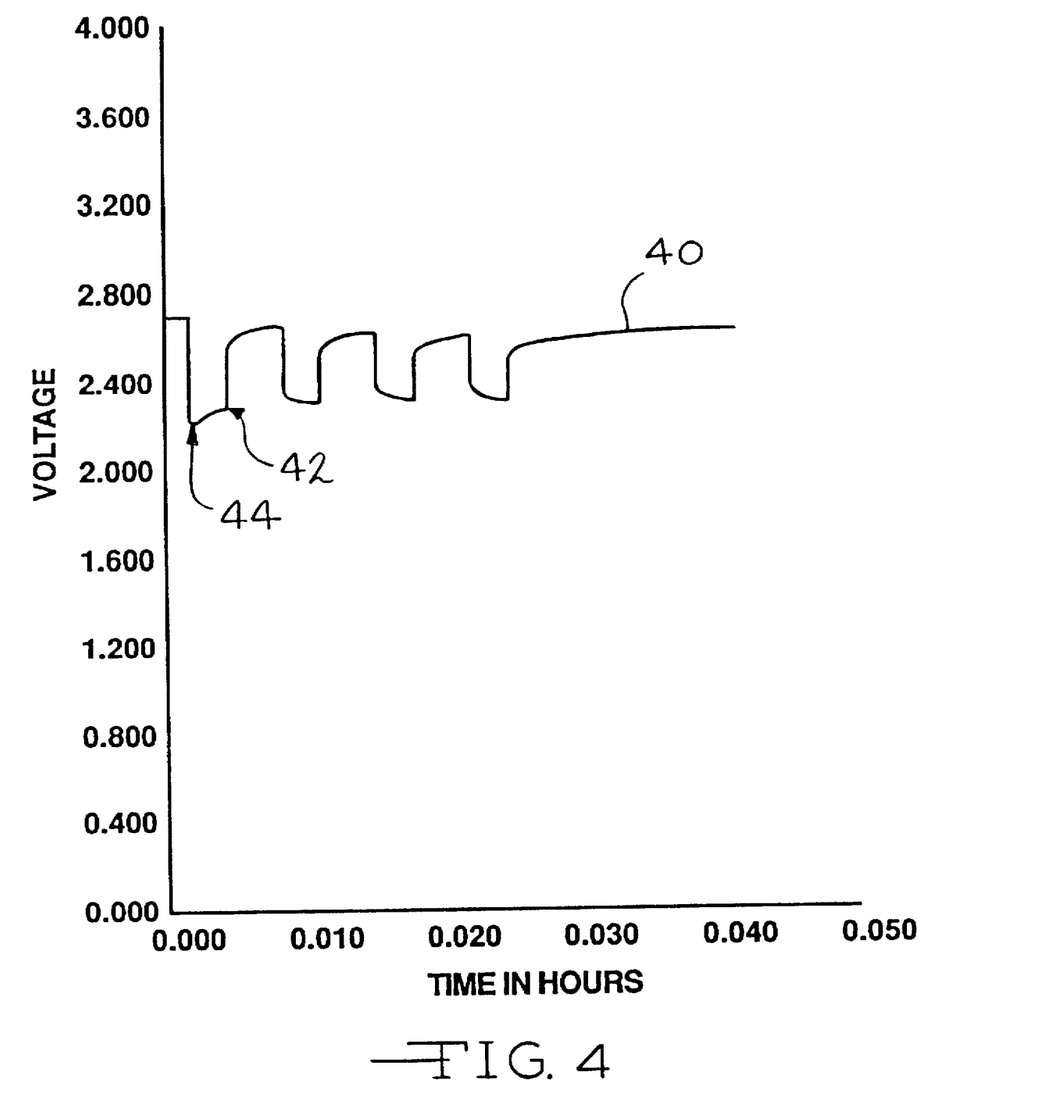
FIGS. 4 to 6 are graphs showing discharge curves of electrochemical cells having 800 mAh of capacity removed before testing and including no additive, 0.01M BSC additive and 0.03M DBC additive, respectively.
Figure 5:
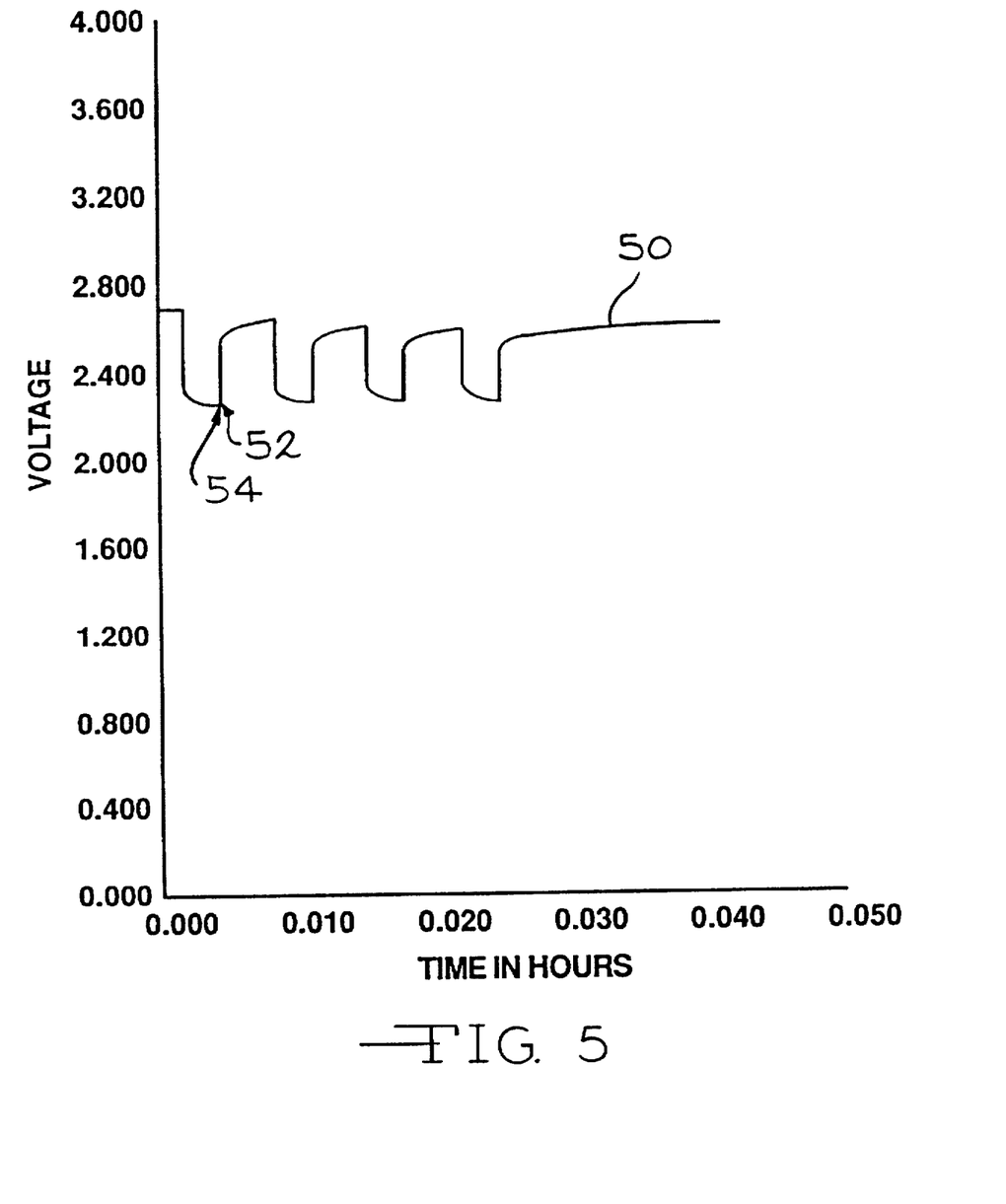
Figure 6:
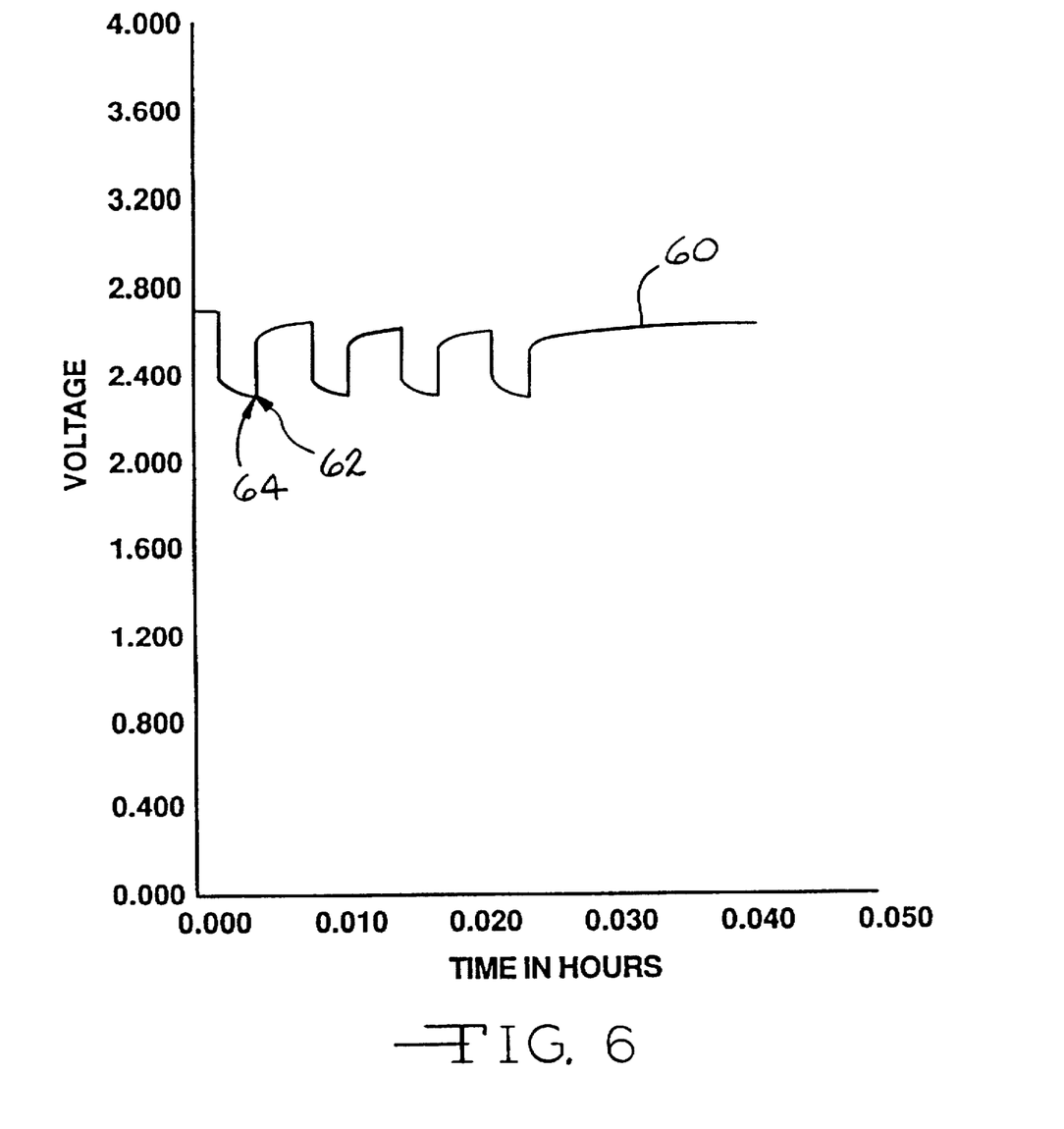

Lithium anode material was pressed on nickel current collector screen and silver vanadium oxide cathode material was pressed on titanium current collector screen. A prismatic cell stack assembly configuration with two layers of microporous polypropylene membrane separator sandwiched between the anode and cathode was prepared. The electrode assembly was then hermetically sealed in a stainless steel casing in a case negative configuration and activated with an electrolyte comprising 1.0M LiAsF$_6$ dissolved in a 50/50 mixture (by volume) of propylene carbonate and 1,2-dimethoxyethane. Some of the cells in this example were provided with 0.01M DSC dissolved in the electrolyte while reference cells were built without the dissolved organic additive. These cells were partially discharged under 200 ohm for 70 hours at 37° C. After storing on open circuit at 37° C. for 8 weeks, they received an application of a pulse train consisting of four 18.4 mA/cm$^2$, 10 second pulses with 15 seconds rest between each pulse at 37° C. The voltage delay results are listed in Table 5 and are graphically shown in FIG. 2 for a cell activated with an electrolyte including an organic carbonate additive, namely, di-(N-succinimidyl) carbonate (DSC), dissolved therein and FIG. 3 for a similarly built cell activated with an electrolyte devoid of an organic carbonate additive. Particularly, in FIG. 2, curve 20 was constructed from the pulse discharge of the cell built according to the present invention with the DSC electrolyte additive with the pulse one end potential indicated at 22 and the pulse one minimum potential indicated at 24. In the pulse discharge curve 30 shown in FIG. 3, the pulse one end potential is indicated at 32 and the pulse one minimum potential is indicated at 34.

TABLE 5

Voltage Delay (V) Data From Hermetic Cells at 37° C.
Effect of DSC Additive

| Without DSC Additive ($P_{1end} - P_{1min}$) | With DSC Additive ($P_{1end} - P_{1min}$) |
|---|---|
| 0.163[a] | 0.116[a] |

[a] Data average from 8 cells

For those cells including the DSC additive, the improvement in cell performance is clearly evident in terms of decreased voltage delay during high current pulse discharge.

EXAMPLE III

Hermetically sealed Li/SVO defibrillator cells were constructed similar to those described in Example II and activated with an electrolyte comprising 1.0M LiAsF$_6$ dissolved in a 50/50 mixture (by volume) of propylene carbonate and 1,2-dimethoxyethane. Some of the cells were provided with 0.01M BSC dissolved in the electrolyte while some of the cells were provided with 0.03M DBC additive dissolved in the electrolyte. Reference cells for the two cell groups were built without organic additives in the electrolyte. These cells were further divided into two sub-groups. One group was partially discharged under 200 ohm for about 56 hours to remove 800 mAh capacity. The second sub-group cells were discharged under 200 ohm for about 87 hours to remove 1200 mAh capacity. After storing on open circuit at 37° C. for 8 weeks, they received an application of a pulse train consisting of four 18.4 mA/cm$^2$, 10 second pulses with 15 second rest between each pulse at 37° C. The voltage delay results are listed in Table 6 and are graphically shown in FIGS. 4 to 9.

Thus, the pulse discharge curve 40 (FIG. 4) was constructed from a Li/SVO cell activated with an electrolyte of 1.0M LiAsF$_6$ dissolved in a 50/50 mixture (by volume) of propylene carbonate and 1,2-dimethoxyethane without any additive therein and after 800 mAh of capacity was removed, wherein the pulse one end potential is indicated at 42 and the pulse one minimum potential is indicated at 44. The pulse discharge curve 50 in FIG. 5 was constructed from a cell similar to that used in FIG. 4 and activated with an electrolyte of 1.0M LiAsF$_6$ dissolved in a 50/50 mixture (by volume) of PC/DME with 0.01M BSC additive and after 800 mAh of capacity was removed, wherein the pulse one end potential is indicated at 52 and the pulse one minimum potential is indicated at 54. And, the pulse discharge curve 60 in FIG. 6 was constructed from a similar electrochemical system as that used in FIG. 5 except that the electrolyte contained 0.03M DBC additive dissolved therein and after 800 mAh of capacity was removed, wherein the pulse one end potential is indicated at 62 and the pulse one minimum potential is indicated at 64.

Figure 7:
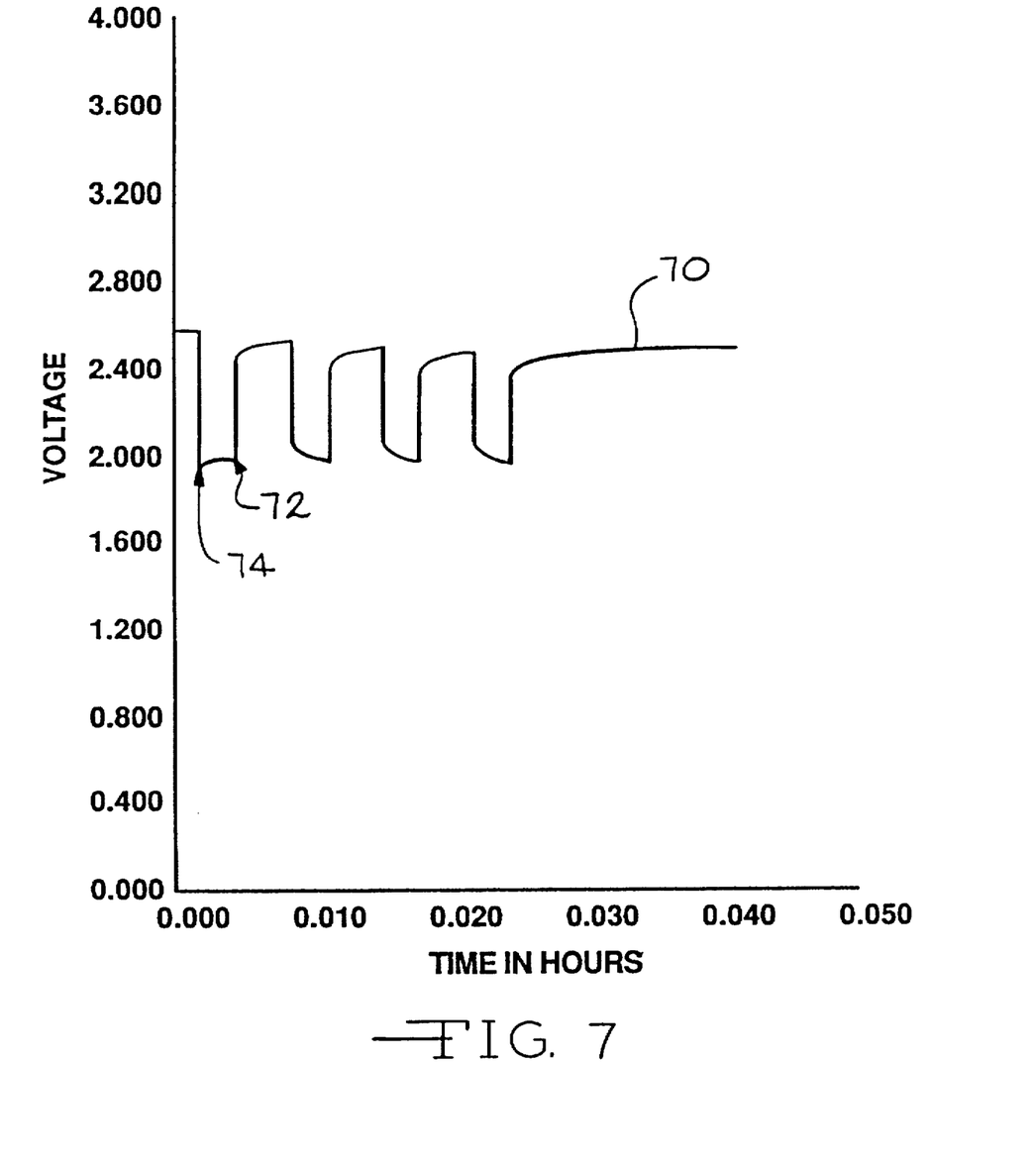
FIGS. 7 to 9 are graphs showing discharge curves of electrochemical cells having 1200 mAh of capacity removed before testing and including no additive, 0.01M BSC additive and 0.03M DBC additive, respectively.
Figure 8:
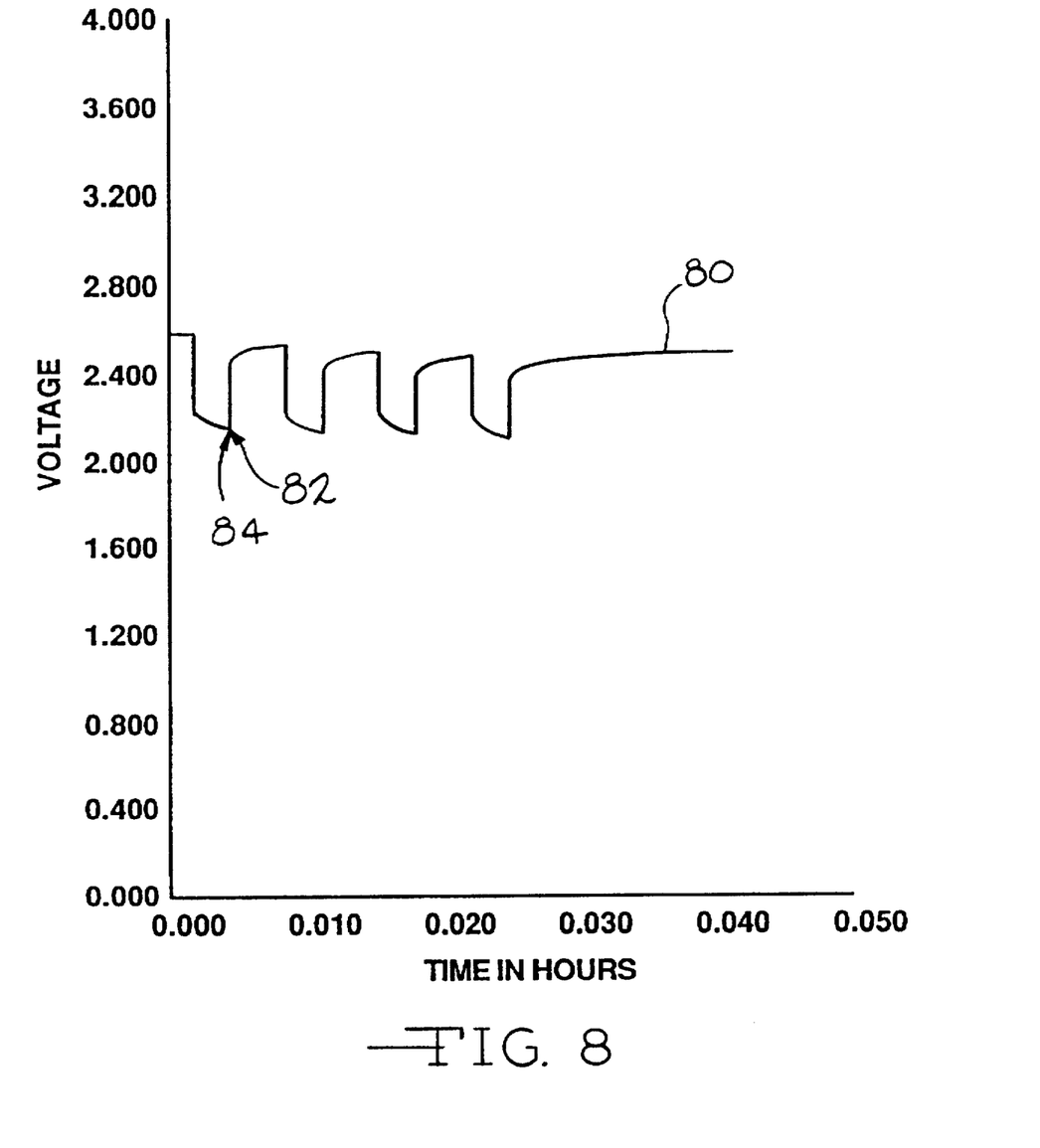
Figure 9:
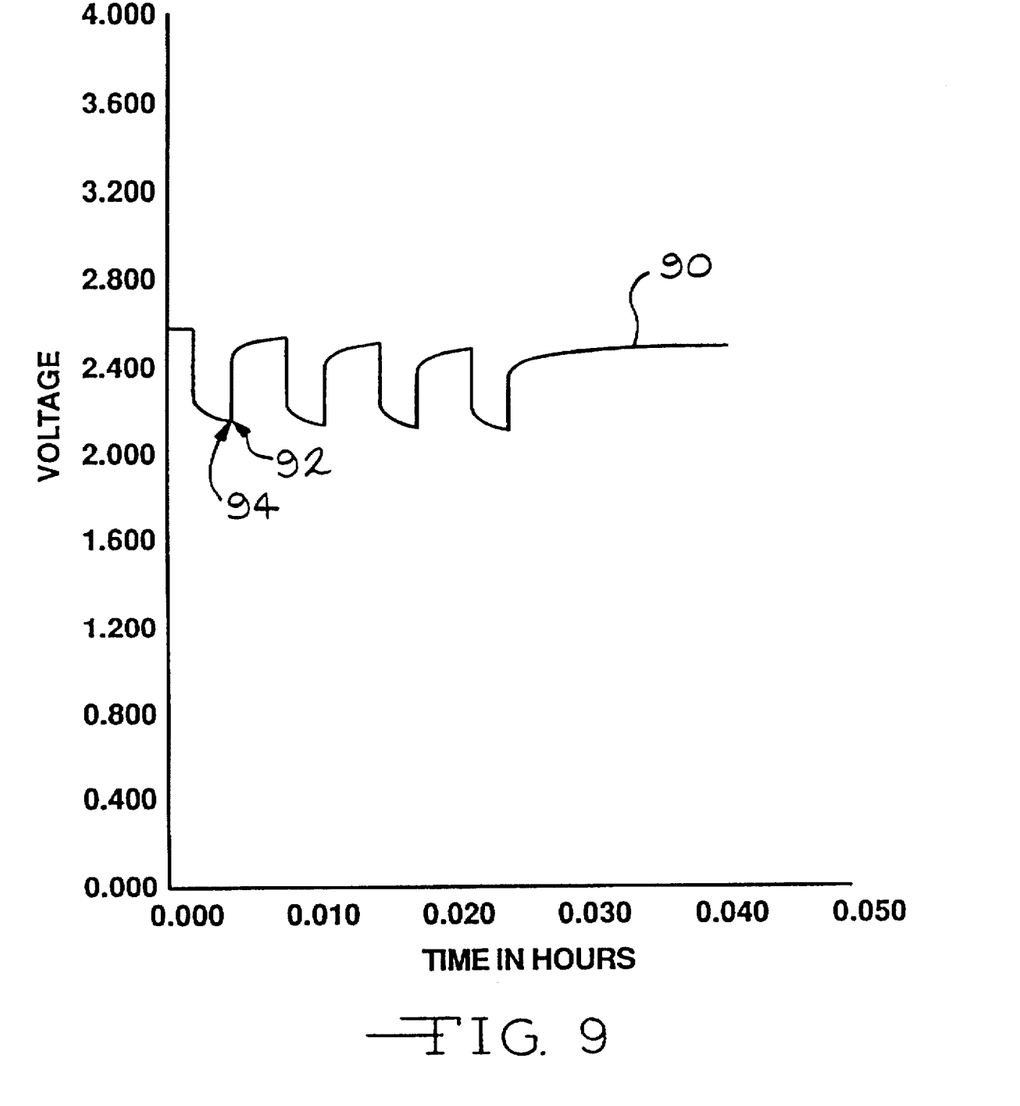

The pulse discharge curve in FIG. 7 was constructed from a Li/SVO cell activated with an electrolyte of 1.0M LiAsF$_6$ dissolved in a 50/50 mixture (by volume) of PC/DME without any additive therein and after 1200 mAh of capacity was removed, wherein the pulse one end potential is indicated at 72 and the pulse one minimum potential is indicated at 74. The pulse discharge curve 80 in FIG. 8 was constructed from a similar electrochemical system as that used in FIG. 7 except that the electrolyte contained 0.01M BSC additive dissolved therein and after 1200 mAh of capacity was removed, wherein the pulse one end potential is indicated at 82 and the pulse one minimum potential is indicated at 84. And, the pulse discharge curve 90 in FIG. 9 was constructed from an electrochemical system similar to those used in FIGS. 7 and 8 except that the electrolyte contained 0.03M DBC additive dissolved therein and after 1200 mAh of capacity was removed, wherein the pulse one end potential is indicated at 92 and the pulse one minimum potential is indicated at 94.

TABLE 6

Voltage Delay (V) Data From Hermetic Cells at 37° C.
Effect of BSC and DBC Additives

| Organic Additive | Capacity Removed | Without Additive[a] ($P_{1end} - P_{1min}$) | With Additive ($P_{1end} - P_{1min}$) |
|---|---|---|---|
| BSC | 800 mAh | 0.068 | 0.003 |
|  | 1200 mAh | 0.034 | 0.000 |
| DBC | 800 mAh | 0.068 | 0.000 |
|  | 1200 mAh | 0.034 | 0.000 |

[a] Both cell groups had the same control cells.

For those cells activated with an electrolyte including the BSC and DBC additives, the improvement in cell performance is clearly evident in terms of voltage delay elimination during high current pulse discharge.

EXAMPLE IV

Organic carbonate additives were also found to be beneficial to low rate lithium batteries with carbon monofluoride as a cathode material.

Hermetically sealed Li/CF$_x$ batteries were constructed in a similar fashion to those described in Example II (except using a non-woven polypropylene separator instead of microporous membrane polypropylene separator) and activated with an electrolyte comprising 1.0M LiBF$_4$ dissolved in GBL. Some of the cells were provided with 0.01M DSC dissolved in the electrolyte while reference cells were built without any organic additive in the electrolyte. These cells were further divided into three sub-groups. These three sub-groups were discharged under constant loads of 2.0K ohm, 5.1K ohm and 10.0K ohm, respectively. The results are summarized in Tables 7, 8 and 9.

TABLE 7

Li/CF$_x$ Cell Potential (V) [a] vs. Time (Days)
Under 2.0K Ohm Load Discharge at 37° C.

| Time (days) | 2 | 15 | 30 | 44 | 60 | 80 |
|---|---|---|---|---|---|---|
| Reference | 2.753 | 2.804 | 2.786 | 2.748 | 2.660 | 1.219 |
| 0.01M DSC | 2.771 | 2.815 | 2.801 | 2.762 | 2.681 | 1.476 |

[a] Average of three cells.

TABLE 8

Li/CF$_x$ Cell Potential (V) [a] vs. Time (Days)
Under 5.1K Ohm Load Discharge at 37° C.

| Time (days) | 2 | 30 | 61 | 96 | 131 | 156 |
|---|---|---|---|---|---|---|
| Reference | 2.186 | 2.853 | 2.826 | 2.798 | 2.771 | 2.690 |
| 0.01M DSC | 2.862 | 2.877 | 2.852 | 2.822 | 2.792 | 2.695 |

[a] Average of three cells.

TABLE 9

Li/CF$_x$ Cell Potential (V) [a] vs. Time (Days)
Under 10.0K Ohm Load Discharge at 37° C.

| Time (days) | 2 | 26 | 61 | 96 | 131 | 156 |
|---|---|---|---|---|---|---|
| Reference | 2.858 | 2.878 | 2.879 | 2.871 | 2.858 | 2.848 |
| 0.01M DSC | 2.917 | 2.910 | 2.909 | 2.902 | 2.887 | 2.877 |

[a] Average of three cells.

For cells with the DSC additive in the electrolyte, the improvement in cell performance is clearly indicated in terms of higher discharge potential throughout the test. Higher cell capacity (mAh) and higher deliverable energy (mWh) are thus expected with the added organic carbonate DSC additive in the electrolyte.

It is believed that the organic carbonates of the present invention are reduced to form a product which deposits on the anode surface. This surface film is ionically more conductive than the film formed in the absence of the additives and it is responsible for the increased cell performance. Since lithium carbonate is known to form a good ionic conductive film on lithium surfaces, the reductive cleavage of the O—X and/or the O—Y bonds in the carbonate additives of the present invention may produce lithium carbonate as the final product.

It is appreciated that various modifications to the inventive concepts described herein may be apparent to those of ordinary skill in the art without departing from the spirit and scope of the present invention as defined by the appended claims.

What is claimed is:

1. An electrochemical cell comprising an alkali metal anode; a cathode; a liquid, nonaqueous electrolyte operatively associated with the anode and the cathode, the improvement in the cell comprising: an organic additive dissolved in the electrolyte, wherein the additive is either linear or cyclic and includes covalent O—X and O—Y bonds on opposite sides of a carbonyl group and has the general structure of X—O—CO—O—Y, wherein at least one of the O—X and the O—Y bonds has a dissociation energy less than about 80 kcal/mole, and wherein X and Y are the same or different and X is selected from NR$_1$R$_2$ and CR$_3$R$_4$R$_5$, and Y is selected from NR'$_1$R'$_2$ and CR'$_3$R'$_4$R'$_5$, and wherein R$_1$, R$_2$, R$_3$, R$_4$, R$_5$, R'$_1$, R'$_2$, R'$_3$, R'$_4$ and R'$_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$ and $R'_5$ can be a hydrogen atom or saturated or unsaturated organic groups containing from 1 to 13 carbon atoms, and wherein and at least $R_3$ is an unsaturated substituent if X is $CR_3R_4R_5$ and Y is $CR'_3R'_4R'_5$.

2. The electrochemical cell of claim 1 wherein the additive is selected from the group consisting of:
   a) $X=Y=NR_1R_2$;
   b) $X \neq Y$ then $X=NR_1R_2$ and $Y=CR_3R_4R_5$;
   c) $X \neq Y$ then $X=NR_1R_2$ and $Y=NR'_1R'_2$;
   d) $X=Y=CR_3R_4R_5$ and $R_3$ is an unsaturated group; and
   e) $X \neq Y$ then $X=CR_3R_4R_5$, $R_3$ is an unsaturated group and $Y=CR'_3R'_4R'_5$, and mixtures thereof.

3. The electrochemical cell of claim 1 wherein the additive is selected from the group consisting of di-(N-succinimidyl) carbonate, benzyl-N-succinimidyl carbonate, di(1-benzotriazolyl) carbonate, N-(benzyloxycarbonyloxy) succinimide, N-benzyloxycarbonyloxy-5-norbornene-2,3-dicarboximide, N-(9-fluorenylmethoxycarbonyloxy) succinimide, 2-(4-methoxybenzyloxycarbonyloxyimino)-2-phenylacetonitrile, 1,5-bis(succinimidooxycarbonyloxy) pentane, succinimidyl-2,2,2-trichloroethyl carbonate, diallyl carbonate, allyl ethyl carbonate, 4-phenyl-1,3-dioxolan-2-one and dibenzyl carbonate, and mixtures thereof.

4. The electrochemical cell of claim 1 wherein the anode is of an alkali metal, the electrolyte is a nonaqueous electrolyte and there is dissolved therein an alkali metal salt, wherein the alkali metal of the salt is the same as the alkali metal comprising the anode.

5. An electrochemical cell, which comprises:
   a) an anode comprising an alkali metal which is electrochemically oxidizable to form metal ions in the cell upon discharge to generate electron flow in an external electrical circuit connected thereto;
   b) a cathode comprising a cathode active material, wherein the electron flow is generated by intercalation of the metal ions formed by oxidation of the alkali metal anode into the cathode active material; and
   c) a liquid, nonaqueous electrolyte operatively associated with the anode and the cathode, the electrolyte comprising an alkali metal salt dissolved therein, the improvement in the electrolyte comprising: an organic additive dissolved therein, wherein the additive is either linear or cyclic and comprises covalent O—X and O—Y bonds on opposite sides of a carbonyl group and having the general structure of X—O—CO—O—Y, wherein at least one of the O—X and the O—Y bonds has a dissociation energy less than about 80 kcal/mole and wherein X and Y are the same or different and X is selected from $NR_1R_2$ and $CR_3R_4R_5$, and Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$, and $R'_5$ can be a hydrogen atom or saturated or unsaturated organic groups containing from 1 to 13 carbon atoms, and wherein and at least $R_3$ is an unsaturated substituent if X is $CR_3R_4R_5$ and Y is $CR'_3R'_4R'_5$.

6. The electrochemical cell of claim 5 wherein the additive is selected from the group consisting of:
   a) $X=Y=NR_1R_2$;
   b) $X \neq Y$ then $X=NR_1R_2$ and $Y=CR_3R_4R_5$;
   c) $X \neq Y$ then $X=NR_1R_2$ and $Y=NR'_1R'_2$;
   d) $X=Y=CR_3R_4R_5$ and $R_3$ is an unsaturated group; and
   e) $X \neq Y$ then $X=CR_3R_4R_5$, $R_3$ is an unsaturated group and $Y=CR'_3R'_4R'_5$, and mixtures thereof.

7. The electrochemical cell of claim 5 wherein the additive is selected from the group consisting of di-(N-succinimidyl) carbonate, benzyl-N-succinimidyl carbonate, di(1-benzotriazolyl) carbonate, N-(benzyloxycarbonyloxy) succinimide, N-benzyloxycarbonyloxy-5-norbornene-2,3-dicarboximide, N-(9-fluorenylmethoxycarbonyloxy) succinimide, 2-(4-methoxybenzyloxycarbonyloxyimino)-2-phenylacetonitrile, 1,5-bis(succinimidooxycarbonyloxy) pentane, succinimidyl-2,2,2-trichloroethyl carbonate, diallyl carbonate, allyl ethyl carbonate, 4-phenyl-1,3-dioxolan-2-one and dibenzyl carbonate, and mixtures thereof.

8. The electrochemical cell of claim 5 wherein the nonaqueous electrolyte comprises a low viscosity solvent selected from the group consisting of an ester, an ether and a dialkyl carbonate, and mixtures thereof.

9. The electrochemical cell of claim 8 wherein the low viscosity solvent is selected from the group consisting of 1,2-dimethoxyethane, dimethyl carbonate, diethyl carbonate, methyl acetate, tetrahydrofuran, diglyme, triglyme and tetraglyme, and mixtures thereof.

10. The electrochemical cell of claim 5 wherein the nonaqueous solvent comprises a high permittivity solvent selected from the group consisting of a cyclic carbonate, a cyclic ester and a cyclic amide, and mixtures thereof.

11. The electrochemical cell of claim 10 wherein the high permittivity solvent is selected from the group consisting of propylene carbonate, ethylene carbonate, γ-butyrolactone, N-methyl-pyrrolidinone, dimethyl sulfoxide, acetonitrile, dimethyl formamide and dimethyl acetamide, and mixtures thereof.

12. The electrochemical cell of claim 11 wherein the cathode comprises a cathode active material selected from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide and copper vanadium oxide, and mixtures thereof.

13. The electrochemical cell of claim 5 wherein the alkali metal salt comprising the electrolyte solution is selected from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$ and $LiCF_3SO_3$, and mixtures thereof.

14. An electrochemical cell, which comprises:
   a) an anode comprising an alkali metal which is electrochemically oxidizable to form metal ions in the cell upon discharge to generate electron flow in an external electrical circuit connected thereto;
   b) a cathode comprising a cathode active material wherein the electron flow is generated by intercalation of the metal ions formed by oxidation of the alkali metal anode into the cathode active material; and
   c) a liquid, nonaqueous electrolyte operatively associated with the anode and the cathode, the electrolyte comprising at least one ion-forming alkali metal salt selected from one of the group consisting of hexafluoroarsenate, hexafluorophosphate and hexafluoroantimonate, and mixtures thereof; and
   d) an organic additive dissolved in the electrolyte, wherein the additive is either linear or cyclic and comprises covalent O—X and O—Y bonds on opposite sides of a carbonyl group and having the general structure of X—O—CO—O—Y, wherein at least one of the O—X and the O—Y bonds has a dissociation energy less than about 80 kcal/mole, and wherein X and Y are the same or different and X is selected from $NR_1R_2$ and $CR_3R_4R_5$, and Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$, $R'_5$ can be a hydrogen atom or saturated or unsaturated organic groups containing 1 to 13 carbon atoms, and wherein and at least $R_3$ is an unsaturated substituent if X is $CR_3R_4R_5$ and Y is $CR'_3R'_4R'_5$.

15. The electrochemical cell of claim 14 wherein the additive is selected from the group consisting of:
   a) $X=Y=NR_1R_2$;
   b) $X \neq Y$ then $X=NR_1R_2$ and $Y=CR_3R_4R_5$;
   c) $X \neq Y$ then $X=NR_1R_2$ and $Y=NR'_1R'_2$;
   d) $X=Y=CR_3R_4R_5$ and $R_3$ is an unsaturated group; and
   e) $X \neq Y$ then $X=CR_3R_4R_5$, $R_3$ is an unsaturated group and $Y=CR'_3R'_4R'_5$, and mixtures thereof.

16. The electrochemical cell of claim 14 wherein the additive is selected from the group consisting of di-(N-succinimidyl) carbonate, benzyl-N-succinimidyl carbonate di(1-benzotriazolyl) carbonate, N-(benzyloxycarbonyloxy)succinimide, N-benzyloxycarbonyloxy-5-norbornene-2,3-dicarboximide, N-(9-fluorenylmethoxycarbonyloxy)succinimide, 2-(4-methoxybenzyloxycarbonyloxyimino)-2-phenylacetonitrile, 1,5-bis(succinimidooxycarbonyloxy)pentane, succinimidyl-2,2,2-trichloroethyl carbonate, diallyl carbonate, allyl ethyl carbonate, 4-phenyl-1,3-dioxolan-2-one and dibenzyl carbonate, and mixtures thereof.

17. A method for reducing voltage delay in an electrochemical cell activated with a liquid, nonaqueous electrolyte, comprising the steps of:
   a) providing an anode comprising an alkali metal;
   b) providing a solid cathode of electrochemically conductive material;
   c) activating the electrochemical cell with the nonaqueous electrolyte operatively associated with the anode and the cathode, the nonaqueous electrolyte comprising an alkali metal salt dissolved therein; and
   d) dissolving an organic additive into the electrolyte, wherein the additive is either linear or cyclic and comprises covalent O—X and O—Y bonds on opposite sides of a carbonyl group and having the general structure of X—O—CO—O—Y, wherein at least one of the O—X and the O—Y bonds has a dissociation energy less than about 80 kcal/mole, and wherein X and Y are the same or different and X is selected from $NR_1R_2$ and $CR_3R_4R_5$, and Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $_3$, $R'_3$, $R_4$, $R'_4$, $R_5$ and $R'_5$ can be a hydrogen atom or saturated or unsaturated organic groups containing from 1 to 13 carbon atoms, and wherein and at least $R_3$ is an unsaturated substituent if X is $CR_3R_4R_5$ and Y is $CR'_3R'_4R'_5$.

18. The method of claim 17 including selecting the additive from the group consisting of:
   a) $X=Y=NR_1R_2$;
   b) $X \neq Y$ then $X=NR_1R_2$ and $Y=CR_3R_4R_5$;
   c) $X \neq Y$ then $X=NR_1R_2$ and $Y=NR'_1R'_2$;
   d) $X=Y=CR_3R_4R_5$ and $R_3$ is an unsaturated group; and
   e) $X \neq Y$ then $X=CR_3R_4R_5$, $R_3$ is an unsaturated group and $Y=CR'_3R'_4R'_5$, and mixtures thereof.

19. The method of claim 17 including selecting the additives from the group consisting of di-(N-succinimidyl) carbonate, benzyl-N-succinimidyl carbonate, di(1-benzotriazolyl)carbonate, N-(benzyloxycarbonyloxy)succinimide, N-benzyloxycarbonyloxy-5-norbornene-2,3-dicarboximide, N-(9-fluorenylmethoxycarbonyloxy)succinimide, 2-(4-methoxybenzyloxycarbonyloxyimino)-2-phenylacetonitrile, 1,5-bis(succinimidooxycarbonyloxy)pentane, succinimidyl-2,2,2-trichloroethyl carbonate, diallyl carbonate, allyl ethyl carbonate, 4-phenyl-1,3-dioxolan-2-one and dibenzyl carbonate, and mixtures thereof.

20. The method of claim 17 providing the nonaqueous electrolyte comprising a low viscosity solvent and selecting the low viscosity solvent from the group consisting of an ester, an ether and a dialkyl carbonate, and mixtures thereof.

21. The method of claim 17 providing the nonaqueous electrolyte comprising a high permittivity solvent and selecting the high permittivity solvent from the group consisting of a cyclic carbonate, a cyclic ester and a cyclic amide, and mixtures thereof.

22. A method for reducing voltage delay in an electrochemical cell activated with a liquid, nonaqueous electrolyte, comprising the steps of:
   a) providing the anode comprising an alkali metal;
   b) providing a solid cathode of electrochemically conductive material;
   c) activating the electrochemical cell with the nonaqueous electrolyte operatively associated with the anode and the cathode, the nonaqueous electrolyte comprising at least one ion-forming alkali metal salt selected from one of the group consisting of hexafluorophosphate, hexafluoroarsenate and hexafluoroantimonate, and mixtures thereof; and
   d) dissolving an organic additive into the electrolyte, wherein the additive is either linear or cyclic and comprises covalent O—X and O—Y bonds on opposite sides of a carbonyl group and having the general structure of X—O—CO—O—Y, wherein at least one of the O—X and the O—Y bonds has a dissociation energy less than about 80 kcal/mole, and wherein X and Y are the same or different and X is selected from $NR_1R_2$ and $CR_3R_4R_5$, and Y is selected from $NR'_1R'_2$ and $CR'_3R'_4R'_5$, and wherein $R_1$, $R_2$, $R_3$, $R_4$, $R_5$, $R'_1$, $R'_2$, $R'_3$, $R'_4$ and $R'_5$ are the same or different, wherein $R_1$, $R'_1$, $R_2$ and $R'_2$ can be a hydrogen atom or saturated or unsaturated organic groups containing from 1 to 9 carbon atoms, and $R_3$, $R'_3$, $R_4$, $R'_4$, $R_5$ and $R'_5$ can be a hydrogen atom or saturated or unsaturated organic groups containing from 1 to 13 carbon atoms, and wherein and at least $R_3$ is an unsaturated substituent if X is $CR_3R_4R_5$ and Y is $CR'_3R'_4R'_5$.

23. The method of claim 22 including selecting the additive from the group consisting of:
   a) $X=Y=NR_1R_2$;
   b) $X \neq Y$ then $X=NR_1R_2$ and $Y=CR_3R_4R_5$;
   c) $X \neq Y$ then $X=NR_1R_2$ and $Y=NR'_1R'_2$;
   d) $X=Y=CR_3R_4R_5$ and $R_3$ is an unsaturated group; and
   e) $X \neq Y$ then $X=CR_3R_4R_5$, $R_3$ is an unsaturated group and $Y=CR'_3R'_4R'_5$, and mixtures thereof.

24. The method of claim 22 including selecting the additives from the group consisting of di-(N-succinimidyl) carbonate, benzyl-N-succinimidyl carbonate, di(1- benzotriazolyl)carbonate, N-(benzyloxycarbonyloxy) succinimide, N-benzyloxycarbonyloxy-5-norbornene-2,3-dicarboximide, N-(9-fluorenylmethoxycarbonyloxy) succinimide, 2-(4-methoxybenzyloxycarbonyloxyimino)-2-phenylacetonitrile, 1,5-bis(succinimidooxycarbonyloxy) pentane, succinimidyl-2,2,2-trichloroethyl carbonate, diallyl carbonate, allyl ethyl carbonate, 4-phenyl-1,3-dioxolan-2-one and dibenzyl carbonate, and mixtures thereof.

* * * * *

UNITED STATES PATENT AND TRADEMARK OFFICE
CERTIFICATE OF CORRECTION

PATENT NO. : 5,753,389
DATED : May 19, 1998
INVENTOR(S) : Gan et al.

It is certified that error appears in the above-identified patent and that said Letters Patent is hereby corrected as shown below:

The compound shown in Col. 6, lines 1-9 should be:

N-Benzyloxycarbonyloxy-5-norbornene-2,3-dicarboximide

Signed and Sealed this

Twenty-ninth Day of May, 2001

Attest:

NICHOLAS P. GODICI

Attesting Officer

Acting Director of the United States Patent and Trademark Office